(12) United States Patent  
Maurell et al.

(10) Patent No.: US 7,987,678 B2  
(45) Date of Patent: Aug. 2, 2011

(54) HOT GAS DUCT AND DUCT SPLITTER ARRANGEMENT

(75) Inventors: Orestes J. Maurell, West Palm Beach, FL (US); Russell Bond Jones, Jupiter, FL (US); Marion Duggans, West Palm Beach, FL (US); Sejko Kolev, Birr (CH)

(73) Assignee: Alstom Technology Ltd., Baden (CH)

( * ) Notice: Subject to any disclaimer, the term of this patent is extended or adjusted under 35 U.S.C. 154(b) by 1176 days.

(21) Appl. No.: 11/685,503

(22) Filed: Mar. 13, 2007

(65) Prior Publication Data

US 2008/0222874 A1 Sep. 18, 2008

(51) Int. Cl.  
*F02C 7/20* (2006.01)

(52) U.S. Cl. .................. 60/796; 60/800; 60/799

(58) Field of Classification Search .......... 60/796, 60/752, 800, 727, 799  
See application file for complete search history.

(56) References Cited

U.S. PATENT DOCUMENTS

| | | | | |
|---|---|---|---|---|
| 4,090,360 A | * | 5/1978 | Erismann | 60/794 |
| 4,339,925 A | | 7/1982 | Eggmann et al. | |
| 4,631,913 A | * | 12/1986 | Kreitmeier | 60/727 |
| 5,272,869 A | * | 12/1993 | Dawson et al. | 60/796 |
| 7,000,406 B2 | * | 2/2006 | Markarian et al. | 60/796 |
| 2006/0249912 A1 | * | 11/2006 | Wilson, Jr. | 277/409 |

FOREIGN PATENT DOCUMENTS

| | | |
|---|---|---|
| DE | 2821270 | 11/1979 |
| DE | 2836539 | 2/1980 |
| EP | 1433924 | 6/2004 |
| EP | 1621439 | 2/2006 |
| JP | 2002317649 | 3/2002 |

OTHER PUBLICATIONS

Eric Jeffs "GT11N2:a Gas Turbine for All Systems", Turbomachinery International, Power Generation, Sep. 1, 1997, XP008096626.

* cited by examiner

*Primary Examiner* — Michael Cuff  
*Assistant Examiner* — Young Choi  
(74) *Attorney, Agent, or Firm* — Leydig, Voit & Mayer, Ltd.

(57) ABSTRACT

A hot gas duct, such as a combustion casing in a gas turbine engine, includes a duct splitter held within the hot gas duct in at least three, preferably four, locations spaced around a peripheral edge of the duct splitter. At least one, preferably two, of the holding locations each comprise a generally cylindrical mounting that projects through a wall of the hot gas duct to engage an edge portion of the duct splitter by means of a slot formed in a circular face of the mounting. Mutually contacting surfaces of the slot and the duct splitter comprise hard face coatings to combat wear due to vibration and differential thermal expansion and contraction. The mountings have cooling holes that penetrate the mounting, so that coolant can flow through the mountings and into the interior of the hot gas duct to cool the mountings and the hard face coatings.

9 Claims, 5 Drawing Sheets

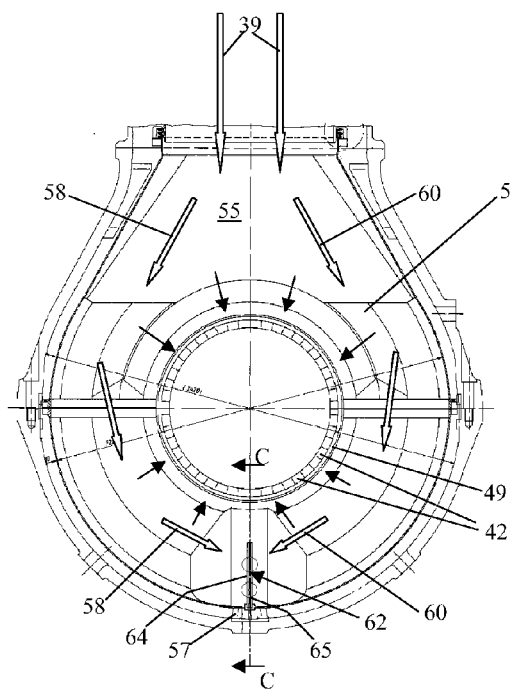
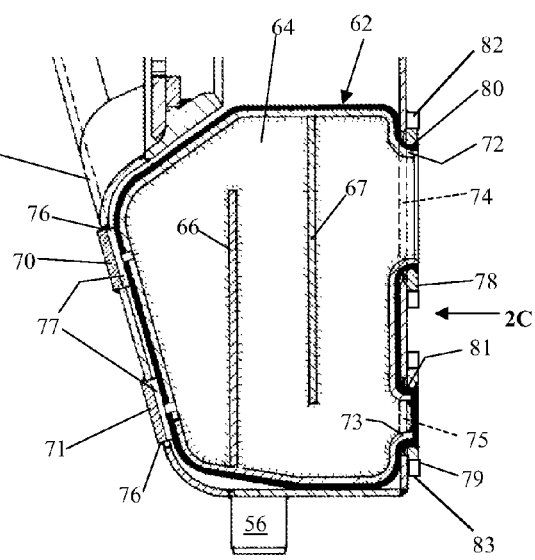
FIG. 1B
*Prior Art*
FIG. 1C
*Prior Art*

HOT GAS DUCT AND DUCT SPLITTER ARRANGEMENT

FIELD OF THE INVENTION

The present invention relates to an improved duct splitter arrangement in a hot gas duct, such as a combustion casing for a gas turbine engine. The invention further relates to a method of manufacturing or retrofitting the duct splitter arrangement.

BACKGROUND

In axial flow gas turbine engines of the type in which the major axis of the combustor(s) extends outwards from the main body of the engine, e.g., at right angles to the engine's rotational axis, it is necessary to provide ducting to turn the combustion gases from the direction in which they leave the combustor into an axial direction for entry to the turbine. Such hot gas ducting also extends around the engine in the form of a so-called "combustion casing", to distribute the combustion gases evenly around the annular entry to the turbine. To effect such distribution, the combustion casing is arranged to divide the combustion gases flowing from the combustor into two streams extending circumferentially of the engine. One stream flows anticlockwise around the combustion casing and the other flows clockwise. To prevent the two combustion gas streams from colliding head-on at the bottom of the combustion casing, a barrier known as a duct splitter is provided, since otherwise excessive buffeting and turbulence would enter the turbine. However, the opposing streams subject the splitter to flexing and shaking forces, thereby causing fretting and wear problems in the mountings, as described in more detail later.

SUMMARY OF THE INVENTION

An object of the present invention is to ameliorate one or more of these concerns.

The present invention comprises a duct splitter held within a hot gas duct at three or more locations spaced around a peripheral edge of the duct splitter, at least one of the locations comprising a mounting that projects through a wall of the hot gas duct to engage the duct splitter, the mounting having a slot therein, an edge portion of the duct splitter being held in the slot, wherein mutually contacting surfaces of the slot and the duct splitter comprise hard face coatings and the mounting is provided with cooling holes that penetrate the mounting such that in use coolant can flow through the mountings and into the interior of the hot gas duct to cool the mountings and the hard face coatings.

Preferably, at least two mountings project through the wall of the hot gas duct to engage respective edge portions of the duct splitter. This provides greater stability for the duct splitter. The other location(s) at which the edge of the duct splitter is held may comprise engagement of the edge of the duct splitter with edge holding means on the duct wall. Such engagement may comprise penetration of the duct wall by at least one projecting edge portion of the splitter to engage a holding feature on the outside of the duct wall.

To allow for welded fabrication of the hot gas duct and subsequent solution treatment of the welds before installation of the mounting(s), each such mounting is not fixed directly to the wall of the hot gas duct, but is secured inside a bushing that is welded into the duct wall before said solution treatment has occurred. The arrangement is such that the mounting is secured inside the bushing by welding the outer periphery of the mounting to the inner periphery of the bushing at a location which is outboard of the hot gas duct wall. This protects the weld from high temperatures within the duct and facilitates future removal and replacement of the mounting by machining out of the weld and re-welding a new mounting into the existing bushing.

In the preferred embodiment, the hot gas duct comprises a combustion casing in a gas turbine engine.

Furthermore, in the preferred embodiment, part of the hot gas duct wall comprises a panel that holds the mounting(s), the panel being welded into place within a correspondingly shaped aperture in the hot gas duct wall. This is an advantage because it facilitates the retrofitting of new duct splitter arrangements in old gas turbine engines, and because dimensions of the panel can be chosen to optimize weld placement relative to existing welds in the fabricated duct wall.

In additional aspects the invention provides a method of manufacturing a gas turbine engine combustion casing provided with a duct splitter and a method of retrofitting a gas turbine engine to replace a duct splitter located in a combustion casing of the gas turbine engine.

Further aspects of the invention will be apparent from a perusal of the following description and claims.

BRIEF DESCRIPTION OF THE DRAWINGS

Exemplary embodiments of the invention will now be described, with reference to the accompanying drawings, in which:

FIG. 1B is a partial view on section line B-B in FIG. 1A;

FIG. 1C is an enlarged view on section C-C in FIG. 1B;

DETAILED DESCRIPTION

Figure 1A:
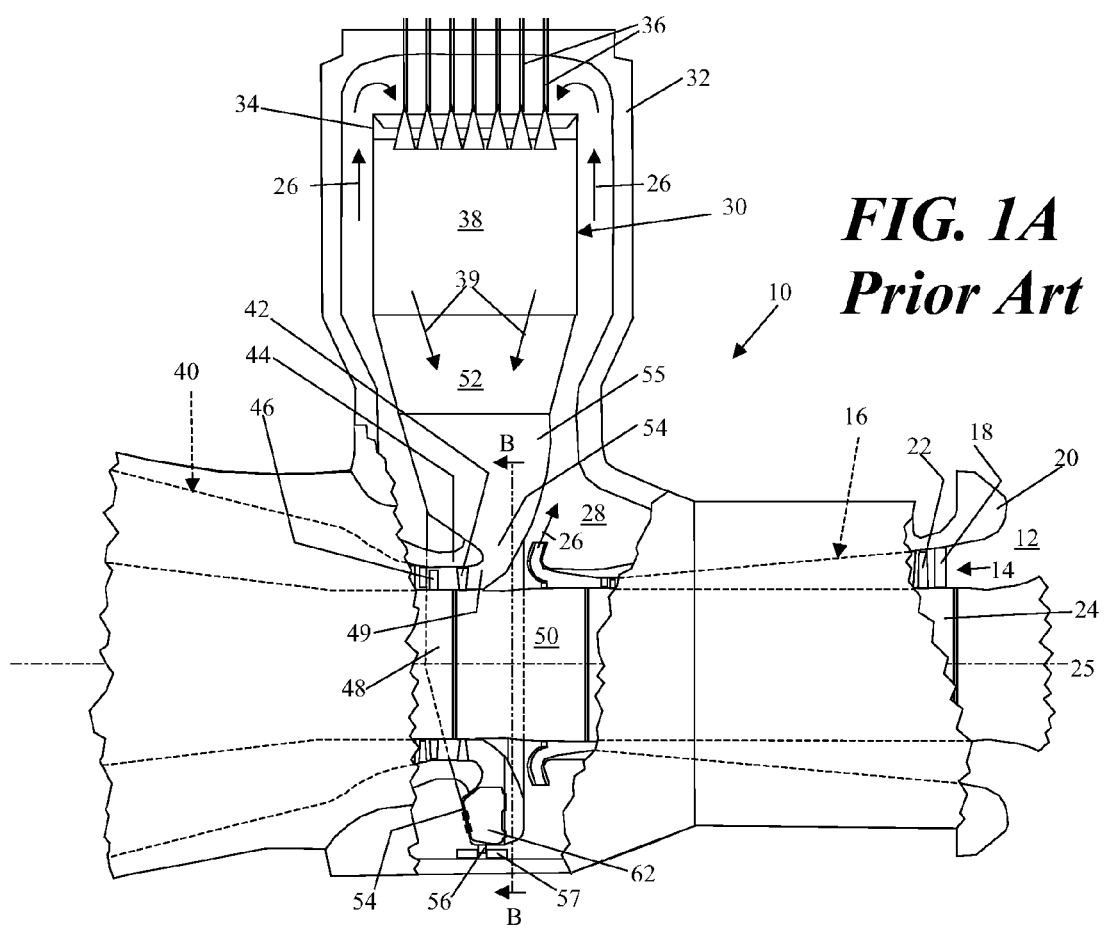
FIG. 1A is a simplified, diagrammatic, part-sectional side elevation of a prior art arrangement, comprising a gas turbine engine that incorporates a combustion casing fitted with a duct splitter.

Referring to FIG. 1A, there is shown a simplified diagrammatic side elevation of a gas turbine engine 10 of a type commonly used for power generation. Parts of the external casings of the engine have been broken-away to reveal selected portions of the engine's internal arrangement.

Beginning at the right-hand side of FIG. 1A, the engine 10 has an air intake 12, only a portion of which is shown. Intake 12 guides air 14 into a multi-stage compressor 16, each stage of which comprises an annular row of stator blades 18 fixed to a static compressor casing 20, followed by an annular row of rotor blades 22 fixed to a rotor drum 24 that rotates about the engine centreline 25. Compressor 16 compresses the air 14 and delivers it as a high pressure flow 26 to a plenum chamber 28 that surrounds a mid-portion of the engine interior.

Also provided at the mid-portion of the engine 10 is a combustor 30 contained within a combustor casing 32. The combustor 30 is large to enable the engine 10 to produce a large amount of power. Therefore, to reduce the overall length of the engine and facilitate maintenance, the combustor 30 is arranged to extend outwards from the rest of the engine at right angles to the engine centreline 25. Compressed air 26 from plenum chamber 28 therefore flows up the inside of the combustor's external casing 32 and enters the outer end 34 of the combustor 30, where it mixes with fuel in injectors 36. The air/fuel mixture then burns in the within combustor 30 to produce high temperature combustion gases 39 that drive a multi-stage turbine 40. Each stage of the turbine comprises an annular row of stator blades 42 fixed to a static turbine casing 44, followed by an annular row of rotor blades 46 fixed to a rotor drum 48 that rotates about the engine centreline 25. At the entry annulus 49 of the turbine, the stator blades 42 comprise inlet guide vanes. The power developed by the turbine 40 can be output to a generator through a shaft driven by the turbine rotor 48. Turbine rotor 48 also drives the compressor rotor 24 through a coupling that rotates inside a stationary drum 50 located between the compressor 16 and the turbine 40.

To carry the combustion gases 39 from the convergent combustor exit 52 to the turbine entry 49, an annular hot gas duct or combustion casing 54 extends around adjacent portions of drum 50 and turbine 40. As will be realized by a person skilled in the art, the combustion gases 39 developed by the combustor 30 must be evenly distributed around the turbine entry annulus 49 after they issue from the combustor exit 52. This is achieved by connecting the combustor exit 52 to the annular combustion casing 54 via a duct portion 55 that converges in the radial direction, but is divergent circumferentially of the combustion casing. This configuration is effective to circumferentially diffuse the combustion gases 39 into the combustion casing 54. As can be seen in FIG. 1A, when viewed in a radial/axial sectional plane, the combustion casing 54 has a convergent profile towards the turbine entry annulus 49. Combustion casing 54 thereby funnels the combustion gases 39 into the turbine entry annulus 49 by gradually turning the flow direction of the combustion gases 39 from a radially inwards direction to an axial direction in the turbine entry annulus 49. The combustion gas flow is also illustrated in FIG. 1B, which is a view on section B-B in FIG. 1A. Here it will be seen that when the combustion gases 39 enter the combustion casing 54 from the circumferentially diffusing duct portion 55, they divide into two streams 58, 60, and are distributed around the annular extent of the combustion casing 54, at the same time entering the turbine inlet 49, as shown by the short flow arrows that point radially inwards.

The bottom of the combustion casing 54, i.e., the portion diametrically opposite the combustor exit 52, has a spigot 56 welded to it, the spigot being received in a hole in a base-plate 57 secured by bolts to an outer casing of the engine. The spigot and hole arrangement restrains side-to-side movement of the combustion casing 54, but allows it to move radially due to thermal expansion and contraction and engine transients. In addition, a duct splitter 62 is provided at the bottom of the combustion casing 54 to prevent the two combustion gas streams 58, 60 from colliding head-on, which would otherwise cause excessive buffeting and turbulence to enter the turbine. However, the opposing streams 58, 60 subject the splitter 62 to flexing and shaking forces, thereby causing fretting and wear problems as detailed below.

FIG. 1C shows the duct splitter 62 in more detail and comprises an enlarged sectional side elevation of the splitter located within the combustion casing 54, the section being taken along line C-C in FIG. 1B. The splitter 62 has a sheet metal construction, in which confronting skins 64, 65 are welded together around their edges and also by means of welding strips 66, 67, thereby bracing the skins against excessive flexing and vibration from the opposing combustion gas streams 58, 60, which impinge on skin 64 and skin 65, respectively.

Splitter 62 is held in position within combustion casing 54 at four locations which are spaced apart around the periphery of the duct splitter. Three-point location might conceivably be practical, but more than three location points are preferred to obtain increased stability of the splitter against the gas forces. In the present instance, the splitter is located by means of two so-called "keys" or mountings 70, 71 in the turbine-facing side of the combustion casing 54, and also by means of two tabs or projections 72, 73 which project through corresponding apertures 74, 75 in the compressor-facing side of the combustion casing to engage with holding features in the form of frames 78, 79, 82, 83.

Figure 2A:
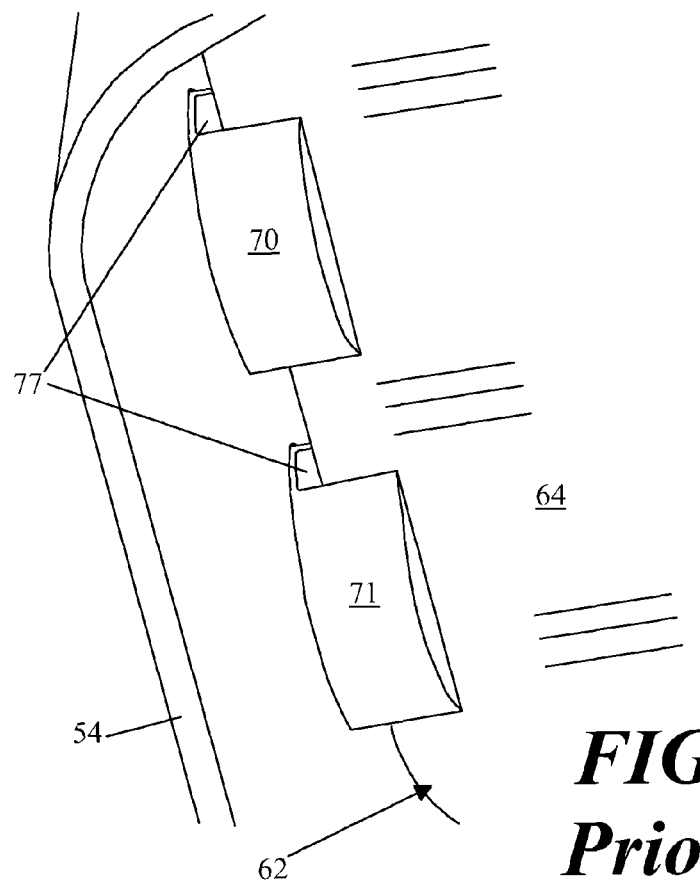
FIG. 2A is a broken-away perspective sketch view of the prior art arrangement, comprising the duct splitter held in mountings within the combustion casing.
Figure 2B:
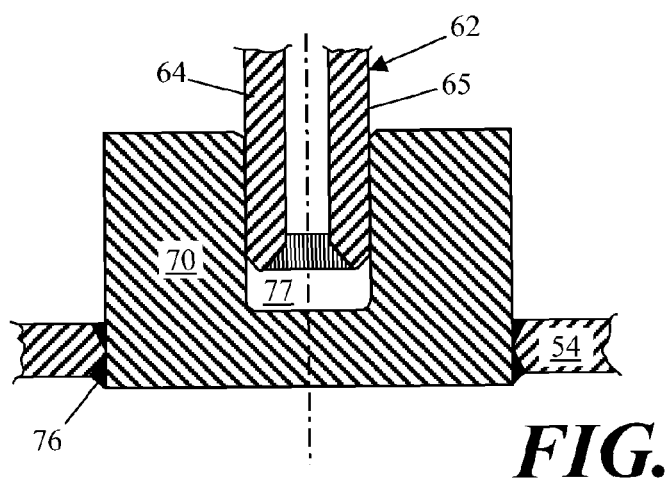
FIG. 2B is a sectional view detail of the prior art arrangement, comprising a portion of the combustion casing wall, a mounting, and an edge portion of the prior art duct splitter held in the mounting, the section being taken across a diameter of the mounting and through the thickness of the splitter.

As best shown in the broken-away perspective sketch view of FIG. 2A and the sectional sketch view of FIG. 2B, the mountings 70, 71 comprise short cylinders that are welded into holes in the combustion casing wall. The welds 76 that secure the mountings 70, 71 to the wall of the combustion casing 54 are shown in FIG. 2B. The mountings 70, 71 have deep slots or grooves 77 cut across their diameters to receive mating edge parts of the splitter 62 in a close, but not interference, fit.

Figure 2C:
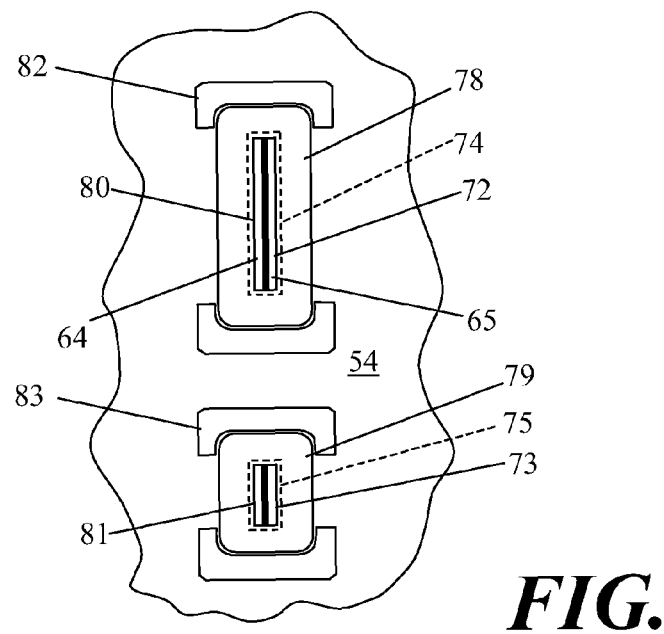
FIG. 2C is a sketch view on arrow 2C in FIG. 1C, comprising part of the compressor-facing side of the combustion casing wall, with fixings for the duct splitter.

Regarding the projections 72, 73 on the edge of the splitter 62, reference should be had to FIGS. 1C and 2C, the latter Figure being a view on arrow 2C in FIG. 1C. Here it will be seen that the apertures 74, 75 in the compressor-facing side of the combustion casing 54 are oversized to receive the tabs 72, 73, which are welded into corresponding slots 80, 81 in the frames 78, 79. The frames 78, 79 are allowed to move slightly over the outer surface of the combustion casing within boundaries set by partial outer frames 82, 83, which are welded to the combustion casing. Wear coatings may be applied between the frames 78, 79 and the combustion casing wall, if required. Within the limits provided by the partial outer frames 82, 83 (which are smaller than the limits that would be provided by apertures 74, 75), this construction allows several degrees of freedom for thermal expansion and contraction of the duct splitter 62 relative to the combustion casing 54.

Although the above design of splitter 62 and its fixings in the combustion casing 54 performs adequately, fretting tends to occur in long-term service where the edge parts of the splitter 62 are received in the slots 77 of the mountings 70, 71. It is not desirable to weld the splitter into place within the combustion casing 54 to overcome this problem because allowance must be made for relative thermal expansion and contraction of the combustion casing and the splitter. This being so, application of a weld hardfacing, such as Stellite (Registered Trademark), to the mating component surfaces, would be desirable as a cost-effective means of combating wear due to fretting of the mating surfaces. Hitherto, this was thought not to be feasible because:

the weld hardfacing would be damaged due to exposure to the high gas temperatures experienced inside the combustion casing 54;

after welding of the parts of the combustion casing 54 together during manufacture, it is necessary to solution heat treat the welds in the combustion casing that are exposed to the hot combustion gases, and this would also damage the hardfacing.

Features of the Illustrated Embodiment of the Invention

Figure 4:
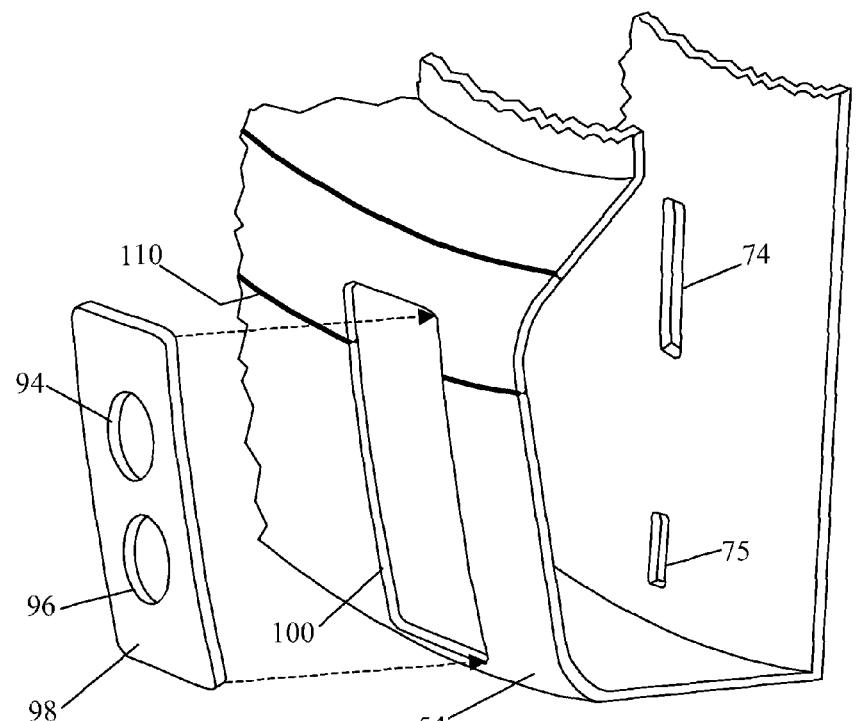
FIG. 4 is a broken-away perspective sketch view showing a portion of a combustion casing in accordance with the present invention, the casing being shown during preparation for mounting of the duct splitter therein.
Figure 5:
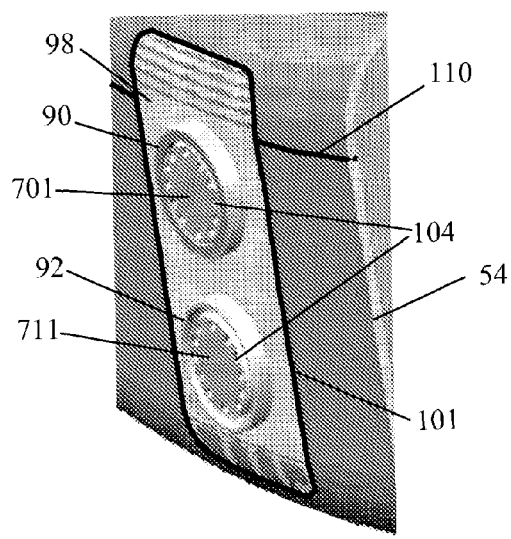
FIG. 5 is a broken-away perspective sketch view showing a portion of the combustion casing of FIG. 4 after installation of duct splitter mountings in accordance with the present invention.

The present invention was devised to overcome or reduce one or more of the above problems. An embodiment of the invention is illustrated with reference to FIGS. 3 to 5.

The embodiment comprises a combination of features, as follows:

As already described, prior art cylindrical mountings 70, 71 were welded directly into holes in the side of the combustion casing 54. However, in the present embodiment, modified, generally cylindrical mountings 701, 711, are fixed into respective bushings 90, 92 by circular welds 93. Welds 93 are external to the combustion casing 54, and are therefore exposed to the relatively cool compressed air in the plenum chamber 28 (see also FIG. 1A). Moreover, holes 94, 96 are provided in a generally rectangular panel 98 and the bushings 90, 92 are fixed into the holes 94, 96 by circular welds 97. Panel 98 is welded into a matching aperture 100 in the combustion casing 54 by rectangular weld 101. It will be seen from the above that though the mountings 701, 711 project through the holes 94, 96 in the panel 98 so that their diametric slots 771 engage the edge of the splitter 62, the mountings 701, 711 are not directly welded to the combustion casing.

To combat the fretting problem, Stellite (preferred) or other suitable hardface material is applied (e.g., using a weld deposition process, as known per se) to produce coatings 102, 103, respectively, on the contacting edge surfaces of the splitter 62 and the slots 771 in the mountings 701, 711.

To reduce the operating temperature of the hardface coatings 102, 103, which in use are exposed to the interior temperature of the combustion casing 54, the mountings 701, 711 are provided with cooling holes 104 that penetrate the mountings longitudinally, so that compressor air can flow from the plenum chamber 28, through the mountings and into the interior of the combustion casing 54, thereby cooling the bodies of the mountings. The inside of the slots 771 may also be cooled, if required, by means of cooling holes 106, which extend through the mountings 701, 711 to allow cooling air to flow from the plenum chamber 28 directly into the bottom of the slots 771.

Manufacturing Processes for the Illustrated Embodiment

During fabrication of the combustion casing 54, apertures 74, 75 (see also FIGS. 14C and 2C) are cut into the compressor-facing side of the combustion casing and the partial outer frames 82, 83 are welded into place around the apertures 74, 75. A suitable aperture 100 is also cut in the turbine-facing side of the combustion casing 54 to take the panel 98 that carries the bushings 90, 92. Panel 98 is pre-formed to match the contours of the combustion casing 54 and welded into place in the aperture 100 along weld-line 101. Holes 94, 96 for the mountings 701, 711 can be cut in the panel 98 either before or after the panel is installed into the combustion casing 54. In the former case, it is optional whether the bushings 90, 92 are welded into their respective holes 94, 96 before or after the panel 98 is installed into the combustion casing 54. At this stage the welds 97, 101, and other welds, such as seam weld 110, that have been necessary during the fabrication of the combustion casing 54, are solution heat treated, as known, to restore the properties of the material (e.g., heat resistant high alloy steel sheet) from which the combustion casing is made.

There is a two-fold advantage in cutting an aperture 100 in the wall of the combustion casing 54 and then welding the panel 98 into the aperture.

Firstly, the fabrication of the complex shape of the combustion casing is such that the welds 97, by means of which the outer peripheries of the bushings 90, 92 are fixed to the combustion casing wall, are liable to overlap seam welds, such as seam weld 110, that extend circumferentially of the combustion casing to join different circumferentially extending portions of the combustion casing wall together. This is undesirable because such laterally overlapping welds produce a relatively large amount of weld material that has been melted twice. However, the dimensions of the panel 98 can be chosen such that the weld line 101 around the periphery of the panel intersects the seam welds at right angles instead of overlapping them. Welds that intersect in this way have smaller areas of twice-melted material and therefore have better properties after solution treatment.

Secondly, when repairing, reconditioning, or retrofitting the duct splitter arrangements of existing gas turbines, the old mountings 70, 71 can be cut out together with the required portion of combustion casing wall to make the aperture 100 for receiving the new panel 98.

Meanwhile, the two sheet metal plates constituting the splitter 62 have been assembled and welded around their edges along weld line 108 and along welding strips 66, 67 (see FIG. 1C). To minimize fretting between the edges of the splitter 62 and the combustion casing 54, the splitter is carefully sized, so that when installed in the combustion casing, its edges will be clear of the inside surface of the combustion casing. After fabrication of the splitter 62, the hardface coatings 102 are applied to the contact surfaces that will engage the slots 771 in the mountings 701, 711. Similarly, after the mountings 701, 711 have been machined to their final form, including their diametric slots 771 and their cooling holes 104, 106, hardface coatings 103 are applied to its splitter-contacting surfaces.

Application of the hardface coatings to the splitter edge portions requires that, over areas of the splitter surface somewhat larger than the edge portions that will actually contact the mountings 701, 711, the splitter surface is ground down to a depth of (e.g.) 0.5 mm below the original surface. It is then built up using a known hardface coating process to a thickness of (e.g.) 2 mm, then ground down, e.g., to one millimeter thickness, so that the finished hardface coating is raised, e.g., 0.5 mm above the original splitter surface. Similarly, the contact surfaces of the slot 771 are ground down below the original slot surface, over-filled using the hardface deposition process, and then the hardface deposit is ground down to achieve a hardface coating that stands slightly above the original slot surface. However, care is taken that the surface grinding and hardface coating deposition process in the slot 771 does not extend to the bottom of the slot, since it is important to keep the hardface coating 103 away from corner stresses.

Figure 3:
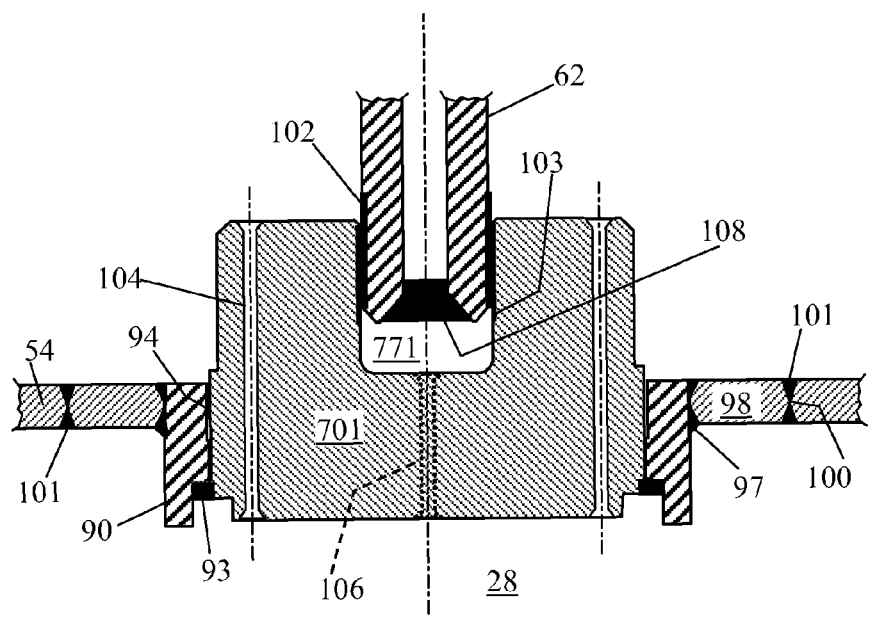
FIG. 3 is a view similar to FIG. 2B, but showing an arrangement in accordance with the present invention.

Following solution heat treatment of the combustion casing 54 (including the welds 97 that secure the bushings 701, 711 to the panel 98 and the weld 101 that joints the panel to the combustion casing wall) the splitter 62 is installed into the combustion casing so that tabs 72, 73 (FIGS. 1C and 2C) on the splitter project through the slot apertures 74, 75 and are welded into their frames 78, 79 on the compressor-facing ("cool") side of the combustion casing. When the splitter 62 has been correctly located, the mountings 701, 711 are inserted into the bushings 90, 92 on the turbine-facing side of the combustion casing so that they engage the edge of the splitter, as shown in FIG. 3. Finally, the mountings 701, 711 are fixed into their respective bushes 90, 92 by circular welds 93.

As previously mentioned, it is envisaged that the invention has relevance to the retrofitting of gas turbines with new duct splitters, when replacement of an old, worn or damaged duct splitter 62 is required. Such a process first of all requires the edge portions of the existing duct splitter to be disengaged from the location features of the combustion casing 54, including not only releasing the tabs 72, 73 of the duct splitter from their frames 78, 79, e.g., by a milling or reaming operation, but also cutting out a portion of the wall of the combustion casing, including the existing mountings 70, 71. The aim of removing the wall portion is to leave an aperture 100 in the wall of the combustion casing having the same shape and size as the new pre-formed panel 98 to be fitted. The new panel 98 can then be welded into place, the holes 94, 96 being cut in the panel 98—and the bushings 90, 92 being welded into the holes 94, 96—either before or after the panel 98 is welded into the aperture 100.

The last few steps in the duct splitter repair or reconditioning process follow the ones outlined previously for new manufacture i.e.; after solution treatment of the parts that include the new welds, including the welds 97 and 101, the previously manufactured splitter 62 and its mountings 701, 711, with their hardface coatings 102, 103 already applied, are installed into the combustion casing, and the mountings are welded into the bushings 90, 92.

Although the above description has focussed on welding to fix the bushings 90, 92 and the frames 82, 83 to the duct wall, and the mountings 701, 711 to the bushings, it may be possible to utilize mechanical fixing methods, such as high temperature brazing, or even screw fixings. However, such mechanical fixing methods would require extensive testing to ensure hazard-free operation in a gas turbine environment.

The present invention has been described above purely by way of example, and modifications can be made within the scope of the invention as claimed. The invention also consists in any individual features described or implicit herein or shown or implicit in the drawings or any combination of any such features or any generalization of any such features or combination, which extends to equivalents thereof. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Any discussion of the prior art throughout the specification is not an admission that such prior art is widely known or forms part of the common general knowledge in the field.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

LIST OF DRAWING REFERENCE NUMBERS

10 gas turbine engine
12 air intake
14 air
16 multi-stage compressor
18 annular row of stator blades
20 static compressor casing
22 annular row of rotor blades
24 rotor drum
25 engine centreline
26 high pressure flow
28 plenum chamber
30 combustor
32 combustor casing
34 outer end of combustor
36 fuel injectors
38 combustion chamber
39 combustion gases
40 multi-stage turbine
42 annular row of stator blades
44 static turbine casing
46 annular row of rotor blades
48 rotor drum
49 turbine entry annulus
50 stationary drum
52 combustor exit
54 combustion casing
55 duct portion
58, 60 opposing streams of combustion gases
56 spigot
57 base-plate
62 duct splitter
64, 65 skins of duct splitter
66, 67 welding strips
70, 71 duct splitter mountings
72, 73 tabs on duct splitter
74, 75 apertures in the compressor-facing side of combustion casing
78, 79, 82, 83 holding frames
76 welds
77 grooves in mountings
80, 81 slots in holding frames
701, 711 modified mountings
90, 92 bushings
93 circular welds
94, 96 holes
98 panel (wall portion of combustion casing)
97 circular welds
100 aperture in combustion casing
101 rectangular weld
771 slots in modified mountings
102, 103 hardface coatings
104, 106 cooling holes in mountings
108 weld line around splitter
110 seam weld

What is claimed is:

1. A hot gas duct comprising:
    a duct wall of a combustor of a gas turbine engine;
    at least one mounting fixed in the duct wall and projecting through the duct wall, the at least one mounting having a slot therein;
    a substantially planar duct splitter extending across the hot gas duct and held within the duct wall in at least three locations spaced around a peripheral edge of the duct splitter, at least one of the locations including an edge portion of the duct splitter being held in the slot of the at least one mounting, wherein mutually contacting surfaces of the slot and the duct splitter comprise hard face coatings and the mounting has cooling holes that penetrate the mounting such that in use coolant can flow from a source of coolant through the mountings and into the interior of the hot gas duct to cool the mountings and the hard face coatings.

2. The hot gas duct as recited in claim 1, wherein at least two mountings project through the duct wall to engage respective edge portions of the duct splitter.

3. The hot gas duct as recited in claim 1, wherein the mounting of the at least one location includes an edge holding element on a surface of a duct wall engaging the edge portion of the duct splitter.

4. The hot gas duct as recited in claim 1, wherein the mounting of the at least one location includes at least one projecting edge portion of the splitter penetrating the duct wall and engagement with an edge holding feature on an outside surface of the duct wall.

5. The hot gas duct as recited in claim 1, further comprising a plurality of bushings fixed on the duct wall and wherein each location includes a mounting fixed inside a respective one of the bushings.

6. The hot gas duct as recited in claim 5, wherein an outer periphery of each mounting is welded to an inner periphery of the respective bushing at a region outboard of the hot gas duct wall.

7. The hot gas duct as recited in claim 5, wherein an outer periphery of the respective bushing is welded into the hot gas duct wall.

8. The hot gas duct as recited in claim 1, wherein part of the duct wall includes a panel that holds the at least one mounting, the panel being welded into place within a correspondingly shaped hole in the duct wall.

9. The hot gas duct as recited in claim 1, wherein the hot gas duct includes a combustion casing of a gas turbine engine.

\* \* \* \* \*